(12) United States Patent
Yamada

(10) Patent No.: US 8,249,358 B2
(45) Date of Patent: Aug. 21, 2012

(54) IMAGE QUALITY EVALUATION METHOD, IMAGE QUALITY EVALUATION SYSTEM AND IMAGE QUALITY EVALUATION PROGRAM

(75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 666 days.

(21) Appl. No.: 12/446,368

(22) PCT Filed: Oct. 18, 2007

(86) PCT No.: PCT/JP2007/070344
§ 371 (c)(1),
(2), (4) Date: Apr. 20, 2009

(87) PCT Pub. No.: WO2008/047865
PCT Pub. Date: Apr. 24, 2008

(65) Prior Publication Data
US 2010/0303364 A1 Dec. 2, 2010

(30) Foreign Application Priority Data

Oct. 19, 2006 (JP) ................................. 2006-285290

(51) Int. Cl.
*G06K 9/46* (2006.01)
*G01N 37/00* (2006.01)
(52) U.S. Cl. .......................................... 382/201; 702/81
(58) Field of Classification Search .................. 382/103, 382/107, 201; 348/14.12, 92, 177, 180, 461, 348/519, 192; 700/109; 702/69, 81, 84
See application file for complete search history.

(56) References Cited

U.S. PATENT DOCUMENTS

| 5,699,458 A * | 12/1997 | Sprague | 382/250 |
| 6,246,435 B1 * | 6/2001 | Patel | 348/192 |
| 2004/0066976 A1 * | 4/2004 | Inokuma | 382/239 |

FOREIGN PATENT DOCUMENTS

| JP | 2003-009186 | 1/2003 |
| JP | 2003-134535 | 5/2003 |

OTHER PUBLICATIONS

ITU-T Telecommunication Standardization Sector of International Telecommunication Union, J.144 (Mar. 2004) Prepublished version, Series J: Cable Networks and Transmission of Television, Sound Programme and Other Multimedia Signals, Measurement of the quality of service.

* cited by examiner

*Primary Examiner* — Abolfazl Tabatabai
(74) *Attorney, Agent, or Firm* — Young & Thompson

(57) ABSTRACT

Provided is an image quality evaluation method for evaluating image qualities of a second image by using a difference from a first image. In the image quality evaluation method, a representative pixel component value indicating a pixel component value that represents pixels in the image frame of one of the images, and pixel position information indicating a pixel position where the representative pixel component value appears are extracted as a feature quantity. By using the representative pixel component value and the pixel position information, which are the image feature quantity, and based on a difference between a pixel component value at the pixel position indicated by the pixel position information in the image frame of the other image and the representative pixel component value, a difference of the entire second image from the first image is estimated.

27 Claims, 7 Drawing Sheets

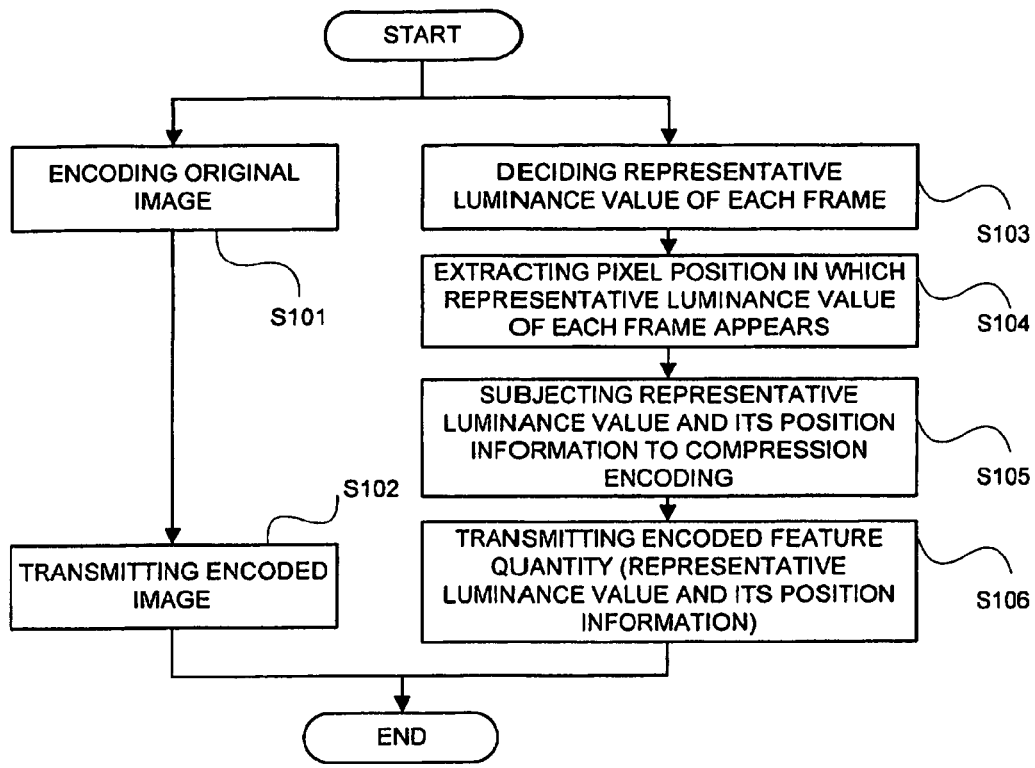
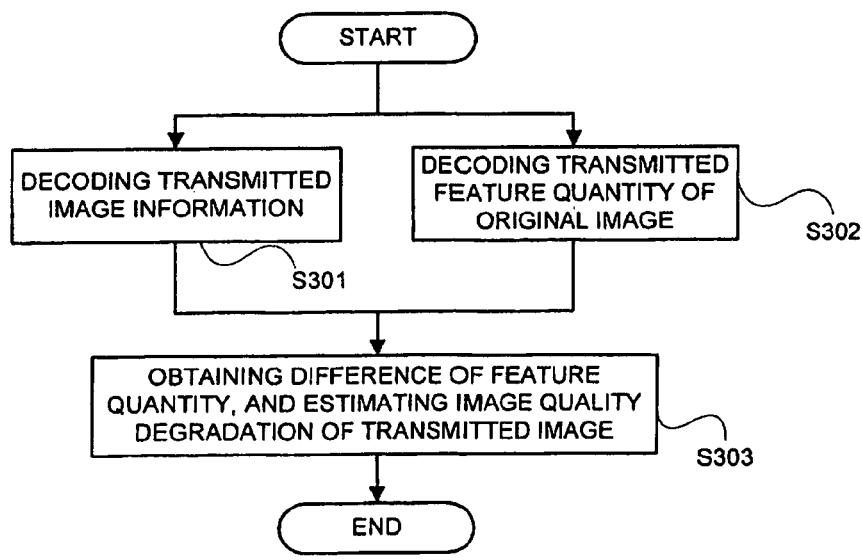

FIG. 4

| 64 | 32 | 20 | 16 | 64 | 64 | 32 | 32 | 64 | 20 | D6 | 64 |
|----|----|----|----|----|----|----|----|----|----|----|----|
| 16 | 80 | 32 | 48 | 64 | 32 | 16 | 20 | 48 | 20 | D6 | 32 |
| 16 | 64 | 20 | 20 | 64 | 16 | 20 | 32 | 64 | 20 | 64 | 64 |
| 64 | 64 | 20 | 32 | 16 | 48 | D6 | 64 | 64 | 32 | 64 | D6 |
| 32 | 64 | 20 | 16 | 16 | 48 | 64 | 32 | 48 | 64 | D6 | 64 |
| 20 | 20 | 16 | 48 | 32 | 64 | D6 | 64 | 48 | 64 | 48 | 48 |

FIG. 5

| 0 | 1 | 0 | 0 | 0 | 0 | 1 | 1 | 0 | 0 | 0 | 0 |
|---|---|---|---|---|---|---|---|---|---|---|---|
| 0 | 0 | 1 | 0 | 0 | 1 | 0 | 0 | 0 | 0 | 0 | 1 |
| 0 | 0 | 0 | 0 | 0 | 0 | 0 | 1 | 0 | 0 | 0 | 0 |
| 0 | 0 | 0 | 1 | 0 | 0 | 0 | 0 | 0 | 1 | 0 | 0 |
| 1 | 0 | 0 | 0 | 0 | 0 | 0 | 1 | 0 | 0 | 0 | 0 |
| 0 | 0 | 0 | 0 | 1 | 0 | 0 | 0 | 0 | 0 | 0 | 0 |

FIG. 7

| 64 | 32 | 20 | 16 | 64 | 64 | 32 | 32 | 64 | 20 | D6 | 64 |
|----|----|----|----|----|----|----|----|----|----|----|----|
| 16 | 80 | 32 | 48 | 64 | 32 | 16 | 20 | 48 | 20 | D6 | 32 |
| 16 | 64 | 20 | 20 | 64 | 16 | 20 | 32 | 64 | 20 | 64 | 64 |
| 64 | 64 | 20 | 32 | 16 | 48 | D6 | 64 | 64 | 32 | 64 | D6 |
| 32 | 64 | 20 | 16 | 16 | 48 | 64 | 32 | 48 | 64 | D6 | 64 |
| 20 | 20 | 16 | 48 | 32 | 64 | D6 | 64 | 48 | 64 | 48 | 48 |

IMAGE QUALITY EVALUATION METHOD, IMAGE QUALITY EVALUATION SYSTEM AND IMAGE QUALITY EVALUATION PROGRAM

APPLICABLE FIELD IN THE INDUSTRY

The present invention relates to an image evaluation method for evaluating an image quality, an image quality evaluation system, an image transmitting device and an image receiving device being employed therefor, and an image evaluating program, and more particularly to an image quality evaluation method for evaluating an image quality of an image that has been transmitted, an image quality evaluation system, an image transmitting device and an image receiving device being employed therefor, and an image quality evaluating program.

BACKGROUND ART

The method for objectively evaluating an image quality of an image that has been transmitted (hereinafter, referred to as a transmitted image), generally speaking, is classified into three kinds. A first evaluation method is a method for directly comparing an original image with the transmitted image, thereby to evaluate the image quality. A second evaluation method is a method for evaluating the image quality only from the transmitted image. A third evaluation method is a method for employing a feature quantity of the original image, thereby to evaluate an image quality.

ITU-T (Telecommunication Standardization Sector of International Telecommunication Union) recommends a specific method associated with the first evaluation method as described in Non-patent document 1. The first evaluation method, when trying to evaluate the image quality of the transmitted image, necessitates an original image (the image that has not been transmitted) in a receiving terminal side for evaluating the image quality. However, it is impossible to transmit the original image to the receiving terminal side with the image quality thereof kept intact due to an upper-limit of a communication band of a transmitting path. Thus, the image quality of the transmitted image cannot be evaluated by employing the first evaluation method in the receiving terminal side.

Contrarily hereto, the second evaluation method, so to speak, is an ideal method because the receiving terminal side can evaluate the image quality by itself. However, even though the receiving terminal side tries to evaluate the image quality of the transmitted image by employing the second evaluation method, its realization is difficult because it is hard to separate the original feature of the image from the feature generated due to image quality degradation.

Finally, in the third evaluation method, transmitting the feature quantity of the original image to the receiving terminal side enables the receiving terminal side to separate the original feature of the image from the feature generated due to the image quality degradation. Thus, if an appropriate feature quantity can be transmitted, it can be expected to evaluate the image quality of the transmitted image at a high precision.

In Patent-document 1, the transmitted image quality monitoring device for transmitting the feature quantity of the original image, thereby to evaluate the image quality of the transmitted image, which employs the third evaluation method, is described. The transmitted image quality monitoring device described in the Patent document 1 divides an input image into blocks of an arbitrary size, subjects video within the block to an orthogonal transformation, extracts an arbitrary frequency component value subjected to the orthogonal transformation, and transmits it as feature quantity, thereby to estimate the image quality degradation from a difference of the feature quantity between the original image and the transmitted image. Additionally, the patent document 1 discloses the method for multiplying the video within the block by a sequence (PN sequence), in which +1 and −1 occur at random, before the orthogonal transformation in order to equally disperse an influence due to degradation upon each frequency component. Further, it also discloses the method for, after the orthogonal transformation, multiplying the video within the block by the PN sequence in order to cope with the locally degraded image.

Patent document 1: JP-P2003-9186A
Non-Patent document 1: ITU-T Recommendation, "J.144 Objective perceptual video quality measurement techniques for digital cable television in the Presence of a full reference", ITU-T recommendation, 2004.

DISCLOSURE OF THE INVENTION

Problems to be Solved by the Invention

However, the transmitted image quality monitoring device described in the Patent document 1 causes a problem that the feature quantity (the number of the frequency components) that can be extracted per one frame of the image becomes few with a limited transmitting path bandwidth, and thus, an estimation precision of the image quality degradation declines because, for each of the extracted frequency component, its frequency component information is encoded and transmitted.

Thereupon, the present invention has an object of providing an image quality evaluation method for evaluating the image quality degradation at a high precision by use of the feature quantity of the original image of which the information quantity is few, an image quality evaluation system, an image transmitting device and an image receiving device being employed therefor, and an image evaluating program.

Means to Solve the Problem

The present invention is an image quality evaluation method for evaluating an image quality of a second image from a difference with a first image, said image quality evaluation method comprising: from an image frame of one of the images, extracting a representative pixel component value indicative of a pixel component value that represents pixels within the above image frame, and pixel position information indicative of a pixel position in which said representative pixel component value appears as a feature quantity; and by employing the representative pixel component value and the pixel position information each of which is the feature quantity of said image, estimating a difference of said entire second image with said first image based upon a difference between the pixel component value at the pixel position being indicated by said pixel position information, and said representative pixel component value within the image frame of the other image.

Also, the image quality evaluation method is an image quality evaluation method for evaluating the image quality of a decoded image, being the second image, said decoded image obtained by decoding an encoded image obtained by encoding an original image, being the first image, in a transmission destination, said image quality evaluation method comprising: extracting the representative pixel component value and the pixel position information as a feature quantity of said original image from the image frame of said original image; encoding said extracted feature quantity of said original image; transmitting said encoded feature quantity of said original image to the transmission destination of said encoded image; upon receipt of said encoded feature quantity of said original image, decoding said encoded feature quantity of said original image that has been received; and estimating a difference with said original image as a degree of image quality degradation of said decoded image based upon the representative pixel component value and the pixel position information each of which is the feature quantity of said original image obtained by decoding, and image information of said decoded image.

Also, the image quality evaluation method is an image quality evaluation method for evaluating the image quality of a decoded image, being the second image, said decoded image obtained by decoding an encoded image obtained by encoding an original image, being the first image, in a transmission destination, said image quality evaluation method comprising: extracting the representative pixel component value and the pixel position information as a feature quantity of said decoded image from the image frame of said decoded image; encoding said extracted feature quantity of said decoded image; transmitting said encoded feature quantity of said decoded image to a transmission source of said encoded image; upon receipt of said encoded feature quantity of said decoded image, decoding said encoded feature quantity of said decoded image that has been received; and estimating a difference with said original image as a degree of image quality degradation of said decoded image based upon the representative pixel component value and the pixel position information each of which is the feature quantity of said decoded image obtained by decoding, and image information of said original image.

Also, the pixel position information is expressed with binary information indicating whether or not the component value of the above pixel is a representative pixel component value by use of 1 or 0, respectively, for each pixel.

Also, the image frame, being a target, is divided into a plurality of small regions; and the pixel position information is expressed with binary information indicating whether or not the representative pixel component value appears within each small region by use of with 1 or 0, respectively, and binary information indicating whether or not the component value of the above pixel is a representative pixel component value by use of 1 or 0, respectively, for each pixel within the small region in which the representative pixel component value has appeared.

Also, the pixel position information expressed with the binary information is subjected to reversible encoding.

Also, the reversible encoding method is an arithmetic encoding method.

Also, the reversible encoding method is a JBIG encoding method, being a binary image encoding method.

Also, the pixel component value that appears in an equal position without being biased within the image frame, being a target, is selected, thereby to extract the representative pixel component value.

Also, the image frame, being a target, is divided into a plurality of small regions, a standard deviation of the pixel component value in each small region is obtained, and the small regions are selected in an order of having the standard deviation of which the value is close to a central value of said standard deviation; and the pixel component value of which an appearance probability is closest to 1/a portion of a value width that the above pixel component value can assume is selected within the selected small region, thereby to extract the representative pixel component value.

Also, a lower-limit value and an upper-limit value of the pixel component value are pre-decided at the moment of extracting the representative pixel component value, and the pixel component value smaller than the lower-limit value and the pixel component value larger than the upper-limit value are excluded from among candidates for the representative pixel component value.

Also, the pixel number for extracting the pixel position in which the representative pixel component value appears, or the region for extracting the pixel position in which the representative pixel component value appears is restricted.

Also, the representative pixel component value is extracted for each of divided regions obtained by dividing the image frame, being a target, into a plurality of regions.

Also, a luminance value is employed as the pixel component value.

Also, the present invention is an image quality evaluation system for evaluating an image quality of a second image from a difference with a first image, said image quality evaluation system comprising: feature quantity extracting means for, from an image frame of one of the images, extracting a representative pixel component value indicative of a pixel component value that represents pixels within the above image frame, and pixel position information indicative of a pixel position in which said representative pixel component value appears as a feature quantity; and error estimating means for, by employing the representative pixel component value and the pixel position information each of which is the feature quantity of said image extracted by said feature quantity extracting means, estimating a difference of the entire second image with the first image based upon a difference between the pixel component value at the pixel position being indicated by said pixel position information, and said representative pixel component value within the image frame of the other image.

Also, the image quality evaluation system is an image quality evaluation system for evaluating the image quality of a decoded image, being the second image, said decoded image obtained by decoding an encoded image obtained by encoding an original image, being the first image, in a transmission destination, said image quality evaluation system comprising an image transmitting device (for example, image transmitting device 1) for encoding and transmitting an inputted original image, and an image receiving device (for example, end user terminal 3) for receiving the encoded image from said image transmitting device: wherein said image transmitting device comprises: feature quantity extracting means (for example, feature quantity extracting device 11) for, from the image frame of said original image, extracting the representative pixel component value and the pixel position information as a feature quantity of said original image; feature quantity encoding means (for example, feature quality encoding device 104) for encoding the feature quantity of the original image extracted by said feature quantity extracting means; and feature quantity transmitting means (for example, communication controller of image transmitting device 1) for transmitting the feature quantity of the original image encoded by said feature quantity encoding means to said image receiving device; and wherein said image receiving device comprises: feature quantity receiving means (for example, communication controller of end user terminal 3) for receiving said encoded feature quantity of said original image; feature quantity decoding means (for example, feature quality decoding device 302) for decoding said encoded feature quantity of said original image received by said feature quantity receiving means; and error estimating means (for example, error estimating device 303) for estimating a difference with said original image as a degree of image quality degradation of said decoded image based upon the representative pixel component value and the pixel position information each of which is the feature quantity of said original image obtained by decoding, and image information of said decoded image.

Also, the image quality evaluation system is an image quality evaluation system for evaluating the image quality of a decoded image, being the second image, said decoded image obtained by decoding an encoded image obtained by encoding an original image, being the first image, in a transmission destination, said image quality evaluation system comprising an image transmitting device for encoding and transmitting an inputted original image, and an image receiving device for receiving the encoded image from said image transmitting device: wherein said image receiving device comprises: feature quantity extracting means (for example, feature quantity extracting device 11 of end user terminal 3) for, from the image frame of said decoded image, extracting the representative pixel component value and the pixel position information as a feature quantity of said decoded image; feature quantity encoding means (for example, feature quality encoding device 104 of end user terminal 3) for encoding the feature quantity of the decoded image extracted by said feature quantity extracting means; feature quantity transmitting means (for example, communication controller of end user terminal 3) for transmitting the feature quantity of the decoded image encoded by said feature quantity encoding means to said image transmitting device; wherein said image transmitting device comprises: feature quantity receiving device (for example, communication controller of image transmitting device 1) for receiving said encoded feature quantity of said decoded image; feature quantity decoding means (for example, feature quality decoding device 302 of image transmitting device 1) for decoding said encoded feature quantity of said decoded image received by said feature quantity receiving means; and error estimating means (for example, error estimating device 303 of image transmitting device 1) for estimating a difference with said original image as a degree of image quality degradation of said decoded image based upon the representative pixel component value and the pixel position information each of which is the feature quantity of said decoded image obtained by decoding, and image information of said original image.

Also, the present invention is the image transmitting device that is applied for an image quality evaluation system for evaluating an image quality of a decoded image, said decoded image obtained by decoding an encoded image obtained by encoding an original image in a transmission destination, said image transmitting device comprising: encoded image transmitting means for encoding and transmitting an inputted original image; feature quantity extracting means for, from an image frame of said inputted original image, extracting a representative pixel component value indicative of a pixel component value that represents pixels within the above image frame, and pixel position information indicative of a pixel position in which said representative pixel component value appears as a feature quantity of said original image; feature quantity encoding means for encoding the feature quantity of the original image extracted by said feature quantity extracting means; and feature quantity transmitting means for transmitting the feature quantity of the original image encoded by said feature quantity encoding means to an image receiving device, being a transmission destination of said encoded image.

Also, the present invention is an image transmitting device that is applied for an image quality evaluation system for evaluating an image quality of a decoded image, said decoded image obtained by decoding an encoded image obtained by encoding an original image in a transmission destination, said image transmitting device comprising: encoded image transmitting means for encoding and transmitting an inputted original image; feature quantity receiving means for receiving information in which a representative pixel component value indicative of a pixel component value that represents pixels within the image frame of said decoded image, and pixel position information indicative of a pixel position in which said representative pixel component value appears have been encoded as a feature quantity of said decoded image; feature quantity decoding means for decoding said encoded feature quantity of said decoded image received by the feature quantity receiving means; and error estimating means for, by employing the representative pixel component value and the pixel position information each of which is the feature quantity of said decoded image obtained by decoding, estimating a difference with said original image as a degree of image quality degradation of said decoded image based upon a difference between the pixel component value at the pixel position being indicated by said pixel position information, and said representative pixel component value within the image frame of said original image.

Also, the present invention is an image receiving device that is applied for an image quality evaluation system for evaluating an image quality of a decoded image, said decoded image obtained by decoding an encoded image obtained by encoding an original image in a transmission destination, said image receiving device comprising: encoded image receiving means for receiving the encoded image obtained by encoding the original image; feature quantity receiving means for receiving information in which a representative pixel component value indicative of a pixel component value that represents pixels within an image frame of said original image, and pixel position information indicative of a pixel position in which said representative pixel component value appears have been encoded as a feature quantity of said original image; feature quantity decoding means for decoding said encoded feature quantity of said original image received by the feature quantity receiving means; and error estimating means for, by employing the representative pixel component value and the pixel position information each of which is the feature quantity of said original image obtained by decoding, estimating a difference with said original image as a degree of image quality degradation of said decoded image based upon a difference between the pixel component value at the pixel position being indicated by said pixel position information, and said representative pixel component value within the image frame of the decoded image obtained by decoding said encoded image.

Also, the present invention is an image receiving device that is applied for an image quality evaluation system for evaluating an image quality of a decoded image, said decoded image obtained by decoding an encoded image obtained by encoding an original image in a transmission destination, said image receiving device comprising: encoded image receiving means for receiving the encoded image obtained by encoding the original image; feature quantity extracting means for, upon receipt of said encoded image, from an image frame of the decoded image obtained by decoding said encoded image, extracting a representative pixel component value indicative of a pixel component value that represents pixels within above image frame, and pixel position information indicative of a pixel position in which said representative pixel component value appears as a feature quantity of said decoded image; feature quantity encoding means for encoding the feature quantity of the decoded image extracted by said feature quantity extracting means; and feature quantity transmitting means for transmitting the feature quantity of the decoded image encoded by said feature quantity encoding means to an image transmitting device, being a transmission source of said encoded image.

Also, the present invention is an image quality evaluation program for evaluating an image quality of a second image from a difference with a first image, said image quality evaluation program causing a computer into which image information of at least one of images is inputted to execute the processes of: from an image frame of the image being indicated by the inputted image information, extracting a representative pixel component value indicative of a pixel component value that represents pixels within the above image frame, and pixel position information indicative of a pixel position in which said representative pixel component value appears as a feature quantity of the above image; and encoding and outputting said extracted feature quantity.

Also, the present invention is an image quality evaluation program for evaluating an image quality of a second image from a difference with a first image, said image quality evaluation program causing a computer into which image information of at least one of images is inputted, and information in which a representative pixel component value indicative of a pixel component value that represents pixels within an image frame of the above image, and pixel position information indicative of a pixel position in which said representative pixel component value appears have been encoded is inputted as a feature quantity of the other image to execute the processes of: decoding the encoded information that has been inputted as a feature quantity, and recovering it to the representative pixel component value and the pixel position information; and by employing said representative pixel component value and said pixel position information that have been recovered, estimating a difference of said entire second image with said first image based upon a difference between the pixel component value at the pixel position being indicated by said pixel position information, and said representative pixel component value within the image frame of the image being indicated by the inputted image information.

An Advantageous Effect of the Invention

The present invention makes it possible to convey information on many pixels by use of the feature quantity of the original image of which the information quantity is few, and to evaluate the image quality of the transmitted image at a high precision because, from an image frame of one of the images, a representative pixel component value indicative of a pixel component value that represents pixels within the above image frame, and pixel position information indicative of a pixel position in which the representative pixel component value appears are extracted as a feature quantity to estimate a difference in the entire image based upon a difference between the pixel component value at the pixel position being indicated by the extracted pixel position information, and the representative pixel component value within the image frame of the other image.

BRIEF DESCRIPTION OF THE DRAWINGS

FIG. 2 is a flowchart illustrating one example of an operation of an image transmitting device 1.

FIG. 3 is a flowchart illustrating one example of an operation of an end user terminal 3.

FIG. 4 is an explanatory view for explaining one example of a luminance value of each pixel in the image frame of a 6.times.12 pixel array.

FIG. 5 is an explanatory view illustrating an example of having subjected the representative luminance value position in the case that the representative luminance value is [32] to binary informationization.

FIG. 7 is an explanatory view illustrating an extraction example of the representative luminance value in the case of having divided the image frame into four pieces.

Figure 1:
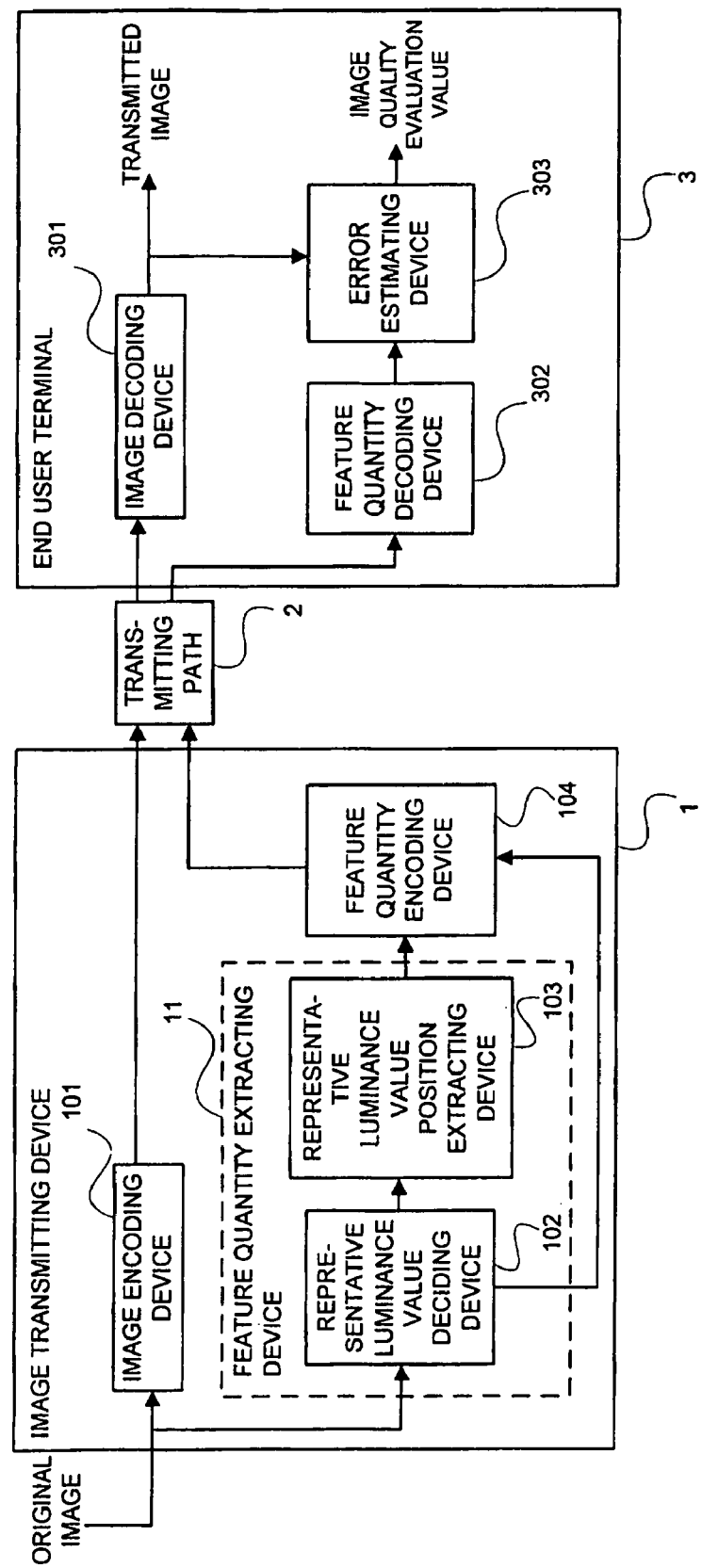
FIG. 1 is a block diagram illustrating a configuration example of the image quality evaluation system in a first embodiment.

DESCRIPTION OF NUMERALS 1 image transmitting device
101 image encoding device
102 representative luminance value deciding device
103 representative luminance value position extracting device
104 feature quality encoding device
2 transmitting path
3 end user terminal
301 image decoding device
302 feature quality decoding device
303 error estimating device

BEST MODE FOR CARRYING OUT THE INVENTION

Hereinafter, embodiments in accordance with the present invention will be explained by making a reference to the accompanied drawings.

Embodiment 1

FIG. 1 is a block diagram illustrating a configuration example of the image quality evaluation system in the first embodiment. As shown in FIG. 1, the image quality evaluation system includes an image transmitting device 1 for, together with an image, transmitting the feature quantity in an original image of the above image, and an end user terminal 3 for, from the feature quality of the original image received together with the image at the moment of having received the image, estimating how the image quality of the received image has degraded as against that of the original image. Further, the image transmitting device 1 and the end user terminal 3 are communicably connected to each other through a transmitting path 2.

The image transmitting device 1 includes an image encoding device 101, a feature quantity extracting device 11, and a feature quantity encoding device 104. Further, the feature quantity extracting device 11 includes a representative luminance value deciding device 102, and a representative luminance value position extracting device 103. The image transmitting device 1 is, for example, a server for delivering moving images and stationary images. Additionally, it is assumed that the image transmitting device 1 includes a communication controlling device for transmitting/receiving various pieces of information, which is not shown in the figure, via the transmitting path 2.

Further, the end user terminal 3 includes an image decoding device 301, a feature quantity decoding device 302, and an error estimating device 303. The end user terminal 3 is, for example, a mobile terminal machine having a network communication function, or a personal computer. Additionally, it is assumed that the end user terminal 3 includes a communication controlling device for transmitting/receiving various pieces of information, which is not shown in the figure, via the transmitting path 2.

The image encoding device 101 encodes the inputted image (original image). Additionally, what is herein called an image includes not only a stationary image but also a moving image. The representative luminance value deciding device 102 decides the luminance value, which becomes a representative, in each frame (image frame) of the inputted image, (hereinafter, referred to as a representative luminance value). Additionally, the number of the image frames is only one (1) with the stationary image. The representative luminance value position extracting device 103, based upon the representative luminance value decided by the representative luminance value deciding device 102, extracts a pixel position in which the representative luminance value appears within the above frame. Thus, the feature quantity extracting device 11 extracts the representative luminance value and the pixel position in which the above representative luminance value appears as a feature quantity in each image frame. The feature quantity encoding device 104 encodes the feature quantity extracted by the feature quantity extracting device 11.

The image encoding device 101, the representative luminance value deciding device 102, the representative luminance value position extracting device 103, and the feature quantity encoding device 104, specifically, are realized with an information processing device that operates according to a program, for example, CPU etc. that the image transmitting device 1 includes. Additionally, the image encoding device 101 may be realized with a hardware device such as an encoder device.

The image decoding device 301 decodes the received image (an encoded image obtained by encoding the original image). The feature quantity decoding device 302 decodes the received feature quantity (an encoded feature quantity obtained by encoding the feature quantity of the original image). The error estimating device 303 estimates an error (image quality degradation) with the original image from the decoded image (transmitted image) and the feature quantity in the original image of the above transmitted image.

The image decoding device 301, the feature quantity decoding device 302, and the error estimating device 303, specifically, are realized with an information processing device that operates according to a program, for example, CPU etc. that the end user terminal 3 includes. Additionally, the image decoding device 301 may be realized with a hardware device such as a decoder device.

Next, an operation of the image quality evaluation system in this embodiment will be explained by making a reference to FIG. 2 and FIG. 3. Herein, the case that the image transmitting device 1 transmits the requested image to the end user terminal 3 via the transmitting path 2 according to a request by the end user terminal 3 is exemplified for explanation. FIG. 2 is a flowchart illustrating one example of an operation of the image transmitting device 1. FIG. 3 is a flowchart illustrating one example of an operation of the end user terminal 3. Additionally, the image (original image) being transmitted to the end user terminal 3 may be inputted into the image transmitting device 1 in some cases, or may be pre-stored in a storage device that the image transmitting device 1 includes in some cases, responding to a necessity.

At first, an operation of the image transmitting device 1 will be explained. As shown in FIG. 2, when the original image is inputted, the image encoding device 101 encodes the inputted original image (step S101). The image encoding device 101, for example, converts image information for expressing the image with a predetermined conversion equation in some cases, or computes it with a predetermined operation equation in some cases, according to a pre-decided encoding technique, thereby to generate image information that has been transmittably compressed. More specifically, in some cases, the image encoding device 101 performs the processes such as separation of the frame, acquisition of difference data, quantization, and multiplexing. Additionally, there exist, for example, MPEG-2, H.264 (MPEG-4 AVC), etc. as an example of the encoding technique that is pre-decided. And, the image transmitting device 1 transmits the original image encoded by the image encoding device 101 to the end user terminal 3 via the transmitting path 2 (step S102). That is, the image transmitting device 1 (more specifically, the communication controlling device that the image transmitting device 1 includes (not shown in the figure)) transmits the image information obtained by the encoding of the original image by the image encoding device 101, to the end user terminal 3.

The image transmitting device 1, in parallel with this process of transmitting the image, transmits the feature quantity as well in the original image of the image being transmitted (encoded image). The original image inputted into the image encoding device 101 is inputted into the feature quantity extracting device 11 as well. The representative luminance value deciding device 102 of the feature quantity extracting device 11 decides (extracts) the luminance value that becomes a representative in each frame of the inputted original image (step S103). Specifically, for each frame, the representative luminance value deciding device 102 selects the luminance value that appears sparsely (scatteredly appears in an equal position without being biased) within the above frame as a representative luminance value according to a predetermined condition.

For example, it is good enough for the representative luminance value deciding device 102 to decide the representative luminance value as mentioned below. At first, it divides one frame, for example, into small blocks having a 16.times.16 pixel array. And, it calculates a standard deviation in terms of the luminance values of the pixels being included in each divided block. And, it may obtain a median of the luminance value standard deviation in each block within the frame to decide the representative luminance value by employing only the blocks of which the standard deviation is close to this median. Additionally, the pixel number of the block being divided may be a number other than 16.times.16 pixels of the above-mentioned example. As a requisite for the representative luminance value, its luminance needs to equally appear in the entirety of the frame without being biased. Specifically, it is good enough to select the luminance value of which an appearance probability is closest to $1/256$ (in the case that the number of gradations of the luminance value is 256) in a half of the blocks that have been extracted (selected) from among all blocks in an order of being close to a median of the luminance standard deviation.

The block of which the luminance standard deviation is small, as a rule, is finely quantized at the time of encoding because the image quality degradation is conspicuous with it. Further, the block of which the luminance standard deviation is large, as a rule, is coarsely quantized at the time of encoding because the image quality degradation is not conspicuous with it. It is thinkable that a degree of the image quality degradation that occurs within these blocks has a tendency of being far apart from a degree of the average image quality degradation of the entirety of the image, so it is desirable that these blocks can be excluded. Thus, in the above-mentioned example, the representative luminance value is selected in the block of which the standard deviation is close to a median of the standard deviation without employing the block of which the standard deviation is remote from a median of the standard deviation. Additionally, the number of the blocks that are employed for selection does not always need to be a half of the total block number, and it is good enough to exclude the block of which a degree of the image quality degradation could become far apart. Further, selection is not determined based upon the number of the blocks, but may be determined based upon the value of the luminance standard deviation.

Further, extraction of the block with a median of the luminance value standard deviation at a center inevitably includes a step of sorting out respective blocks on the basis of the standard deviation, and resultantly, the blocks scattered locationally are extracted. Thus, selecting the representing luminance value in such extracted blocks on the basis of the appearance probability, resultantly, enables the luminance value that equally have appeared in the entirety of the frame without being biased to be selected as a representative luminance value.

Further, a low luminance value and a high luminance value, out of the luminance values of entire gradations, easily occurs in a portion where the luminance value is saturated, for example, in a portion of black crushing and in a portion of white skipping. The similar luminance value easily occurs in the circumference thereof, and the above luminance value is likely to appear biasedly. It is desirable not to define such a luminance value as a representative luminance value because defining the luminance value, which has appeared biasedly, as a representative luminance value leads to a decline in the precision at which the degradation is estimated. Specifically, it is good enough to prepare two thresholds and to exclude the luminance value that is smaller than a first threshold for specifying a minimum luminance value, and the luminance value that is larger than a second threshold for specifying a maximum luminance value from candidates for representative luminance values. For example, in the above-mentioned method, it is good enough not to select the luminance value that is smaller than the first threshold, and the luminance value that is larger than the second threshold as a representative luminance value irrespective of the appearance probability at the moment of selecting the representative luminance value on the basis of the appearance probability of the luminance value. This makes it possible to define, for example, only luminance values 32 to 220, out of 256 gradations, as a candidate for the representative luminance value.

Further, there is the case that there are limits to a transmission rate of the feature quality being transmitted, depending upon a configuration of the system (or an application that is caused to activate). In such a case, limits may be put to the number of the blocks in which the representative luminance value is extracted, or to the appearance probability of the representative luminance value in order to lessen an information quantity of the feature quantity. For example, the limits such that the representative luminance value is extracted within 1/12 of all blocks with a median of the above-mentioned luminance standard deviation at a center, the limits such that the appearance number of the representative luminance values does not exceed 500, or the like may be put.

When the representative luminance value is decided, the representative luminance value position extracting device 103, next, extracts the pixel position in which the representative luminance value has appeared within the above frame (hereinafter, referred to as a representative luminance value position) (step S104). Specifically, the representative luminance value position extracting device 103 sequentially scan the pixels within the image frame, determines whether or not the luminance value of each pixel is a representative luminance value, and collects the pixel position in which the representative luminance value appears within the above frame, thereby to extract the representative luminance value position. The representative luminance value position extracting device 103, for example, may generate information, in which each pixel within the frame and information indicating whether or not the luminance value of the above pixel is a representative luminance value have been caused to correspond to each other as information indicative of the representative luminance value position, thereby to extract the representative luminance value position. Further, for example, also by pre-assigning an identifier to each pixel, and generating information in which the identifiers of the pixels of which the luminance value is a representative luminance value have been collected, it is also possible to extract the representative luminance value position.

Each of FIG. 4 and FIG. 5 is an explanatory view illustrating an extraction example of the representative luminance value position. FIG. 4 shows one example of the luminance value of each pixel in the image frame of a horizontally-positioned 12.times.vertically-positioned 6 pixel array. Further, FIG. 5 shows one example of having subjected the representative luminance value position in the case that the representative luminance value is [32] to the binary informationization in the image frame shown in FIG. 4. In an example shown in FIG. 5, each pixel within the image frame shown in FIG. 4 has been subjected to the binary informationization as 1 when the luminance value of the above pixel is a representative luminance value, and as 0 when it is not so. In FIG. 5, it is shown that, for example, the luminance value of the pixel being positioned at (x,y)=(0,0) is not a representative luminance value, and the luminance value of the pixel being positioned at (x,y)=(0,1) is a representative luminance value. Herein, the low left pixel is expressed as (x,y)=(0,0) with a horizontal direction of the image frame and a vertical direction of the image frame defined as x and y, respectively.

Next, when the feature quantity is extracted by the representative luminance value deciding device 102 and the representative luminance value position extracting device 103, the feature quantity encoding device 104 subjects the extracted feature quantity (specifically, the representative luminance value and the representative luminance value position) to compression encoding (step S105). Herein, the non-reversible encoding method of which a compression ratio is high may be employed, or the reversible encoding method may be employed as a method for encoding the representative luminance value position. As an example of the reversible encoding method, there exists arithmetic encoding, and JBIG encoding, being an international standard of binary image encoding. Additionally, while the representative luminance value may be encoded by employing the encoding technique in accordance with the reversible compression, it also possible to transmit information indicative of the representative luminance value as it stands without subjecting it to data compression because an information quantity thereof is not much even though it is kept intact.

The feature quantity encoding device 104, at the moment of encoding the representative luminance value position in accordance with the reversible compression, may curtail the information quantity all the more by encoding it as mentioned below. At first, the feature quantity encoding device 104 collects information of the blocks in which the representative luminance value exists (effective block), out of all blocks within the frame. The feature quantity encoding device 104 subjects the position information of the block to the binary informationization as 1 when the representative luminance value exists within the block, and as 0 when it is not so. For example, upon dividing image information of SDTV having a 720.times.480 pixel array into blocks each having a 16.times.16 pixel array, it follow that the number of the divided blocks is 1,350. When the position information of the effective blocks in this case is subjected to the binary informationization, it can be expressed with an information quantity of 1,350 bits.

Thereafter, with regard to the effective block, the pixel position of the representative luminance value that appears within the block (hereinafter, referred to as an intra-block representative luminance value position) is subjected to the compression encoding. In the above-mentioned example, the information quantity of 256 bits per one block can be encoded. Further, it is good enough that the number of pieces of the information indicative of the intra-block representative luminance value position is identical to that of the blocks (effective blocks) in which the representative luminance value exists. Thus, by compression-encoding the pixel position of the representative luminance value into the position information of the effective block and the information indicative of the intra-block representative luminance value positions of which the number is the number of the effective blocks subsequent hereto, each of which is information indicative of the representative luminance value position in one frame, for example, after an order in which the blocks are juxtaposed is pre-decided, the information quantity of the feature quantity can be lessened all the more.

Figure 6:
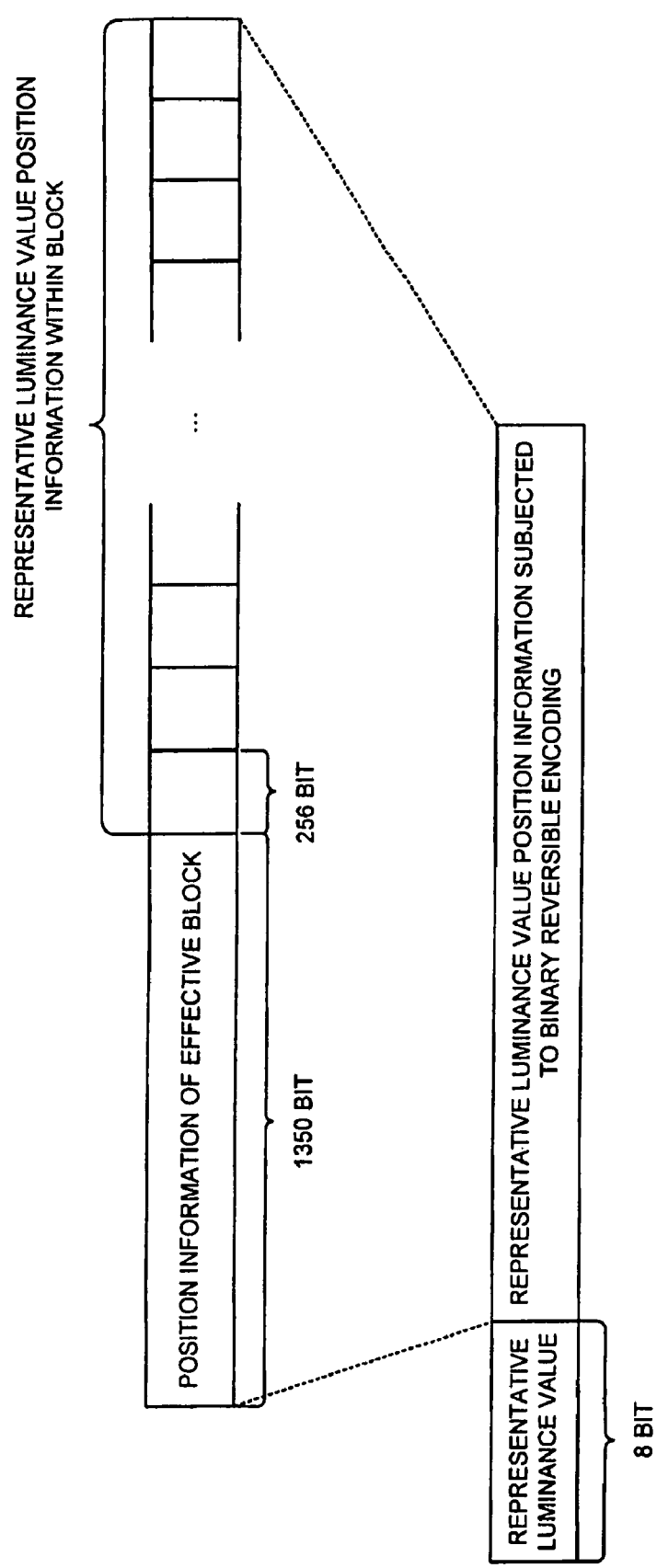
FIG. 6 is an explanatory view illustrating an example of having subjected the feature quantity of the image frame having a 720.times.480 pixel array to the compression encoding by employing the representative luminance value position within an effective block.

FIG. 6 shows an example of having subjected the feature quantity of the image frame having a 720.times.480 pixel array to the compression encoding by employing the representative luminance value position within the effective block. As shown in the upper stage of FIG. 6, the information indicative of the representative luminance value position, out of the feature quantity, can be expressed with binary information (1,350 bits) indicative of the position of the effective block, and the information subjected to the binary reversible encoding (effective block number×256 bits) indicative of the intra-block representative luminance value positions of which the number is the number of the effective blocks subsequent hereto. All of the information quantity of the feature quantity in this case, as shown in the lower stage of FIG. 6, become (the information quantity of the representative luminance value (8 bits)+the encoding quantity of the representative luminance value position information subjected to the compression encoding (1,350+(effective block number×256) bits). Additionally, it is also possible that the representative luminance value deciding device 102 and the representative luminance value position extracting device 103 collect the information necessary for subjecting the representative luminance value position information to the compression encoding, for example, information of the block size or the effective block in the step of extracting the feature quantity, and input it into the feature quantity encoding device 104. Further, the representative luminance value position extracting device 103 may play a role of the feature quantity encoding device 104 together with its own role, thereby to operate so that it extracts the pixel position of the representative luminance value, and subjects it to the compression encoding.

And, the image transmitting device 1 transmits the feature quantity subjected to the compression encoding to the end user terminal 3 via the transmitting path 2 (step S106). The feature quantity is preferably transmitted synchronously with the image data in such a manner that, for example, whenever a one-frame portion of the image data is transmitted, the feature quantity of the above frame is transmitted. Additionally, the feature quantity does not always need to be synchronized with the image data in a frame unit, and before or after data of an image is transmitted, the feature quantity of an all-frame portion of the above image may be transmitted. Further, the feature quantity of a constant-time portion of the frame (for example, 30 frames as a one-second portion of the frame) may be collected, thereby to transmit it each constant time (one second). Additionally, at the moment of transmitting the feature quantity, identification information indicating that the above feature quantity is a feature quantity of what frame of what image may be transmitted together therewith.

For example, when the image information equivalent to a predetermined frame number is inputted from the image encoding device 101, the image transmitting device 1 may affix the feature quantity of the corresponding frame, out of the feature quantity inputted from the feature quantity encoding device 104, to the inputted image information, thereby to transmit it. Further, for example, when the image transmitting device 1 causes the image encoding device 101 to extract and encode the feature quantity equivalent to the number of all frames in the first place, and then receives an information saying the completion of the encoding from the image encoding device 101, the image transmitting device 1, firstly, may transmit the feature quantity equivalent to the number of all frames, and one after another, may transmit the image information equivalent to the number of all frames.

Next, an operation of the end user terminal 3 will be explained. The end user terminal 3 receives the image information transmitted from the image transmitting device 1 (the encoded image information) and the feature quantity (encoded feature quantity) in its original image. As shown in FIG. 3, the image decoding device 301 of the end user terminal 3, upon receipt of the encoded image information, decodes the received image information (step S301). The image decoding device 301, specifically, converts the encoded image information with a predetermined conversion equation in some cases, or computes it with a predetermined operation equation in some cases, according to the decoding technique that corresponds to the encoding technique employed for the encoding (for example, the decoding technique corresponding to the MPEG-2, and the decoding technique corresponding to the H.264 (MPEG-4 AVC), thereby to recover the encoded image information to image information identical to the image information that has not been encoded. That is, the image decoding device 301 generates the image information for expressing the image identical to the original image that was expressed before the encoding. Additionally, with many encoding techniques, the information compressed by the encoding cannot be completely recovered, and is decoded into the degradation image in which the image quality was degraded.

The end user terminal 3, in parallel to a process of decoding this image information, performs a process as well of decoding the feature quantity. The feature quantity decoding device 302 of the end user terminal 3, upon receipt of the encoded feature quantity, decodes the received feature quantity (step S302). The feature quantity decoding device 302, for example, converts the encoded feature quantity with a predetermine conversion equation in some cases or computes it with a predetermined operation equation in some cases, according to the decoding technique that corresponds to the encoding technique performed by the feature quantity encoding device 104, thereby to recover the encoded feature quantity to a feature quantity identical to the feature quantity that has not been encoded (the representative luminance value and the information indicative of the representative luminance value position). That is, the feature quantity decoding device 302 generates information indicative of a feature quantity identical to the feature quantity that was indicated before the encoding. Additionally, when the feature quantity encoding device 104 employs the reversible encoding technique (for example, the JBIG encoding technique), the feature quantity decoding device 302 can recover the encoded information to information that completely coincides with the before-encoding information by performing the operation such as an adaptive arithmetic decoding.

When the received image frame and the feature quantity in the original image of the above frame are recovered, the error estimating device 303 estimates the image quality degradation of the transmitted image in the above frame from the recovered information (step S303). The error estimating device 303 collects, for example, a difference with the representative luminance value of the transmitted image in the representative luminance value position of the original image, and estimates an error (that is, the image quality degradation) between the original image and the transmitted image. The error estimation can be obtained with a square-law error or an S/N ratio.

For example, when it is assumed that the representative luminance value in the original image, the number of pixels within one frame of the representative luminance value, and the luminance value of the transmitted image in the representative luminance value position of the original image are defined as Y, N, and Yi, respectively, an estimated square-law error E in the above frame can be obtained with Equation (1) shown next.

$$E = \frac{1}{N} \sum_{i=0}^{N-1} (Y - Y_i)^2 \qquad \text{[Numerical equation 1]}$$

And, an estimated S/N can be computed as an Equation (2) shown next. Additionally, [255], being a constant in Equation (2), is indicative of a width of gradations of the pixel (that is, the number of the gradations of the luminance value−1) in a digital image subjected to 8-bit sampling.

$$EPSNR = 10\log_{10}\left[\frac{255 \times 255}{\frac{1}{N}\sum_{i=0}^{N-1}(Y-Y_i)^2}\right] \qquad \text{[Numerical equation 2]}$$

In such a manner, regarding an error between the estimated original image and the transmitted image as an error of the entirety of the image leads to evaluation of the image quality of the transmitted image as a degree of the image quality degradation. For example, it is good enough to determine whether the image quality is good or bad by deciding a five-stage image quality evaluation value, for example, based upon magnitude of the estimated error, or the like. Additionally, it is also possible to synthesize evaluation of all frames in the moving image that is comprised of a plurality of frames, thereby to define its synthesis evaluation as an image quality evaluation value of the entirety of the moving image. Further, for example, such a use method for individually evaluating each frame, thereby to request re-transmission of the badly-evaluated frame (or retransmission by use of another transmission path, or retransmission after encoding with another technique) may be adopted. Further, for example, such a use method for evaluating the image quality of the initial frame, and thereafter determining whether or not to receive the succeeding frames may be adopted.

As mentioned above, in accordance with this embodiment, extracting the luminance value that sparsely appears within the frame (or within the block) as a representative luminance value, and extracting the extracted representative luminance value and the representative luminance value position information indicative of the intra-frame pixel position of the representative luminance value as a feature quantity make it possible to transmit information on the pixels of the much more original images by use of an identical information quantity, for example, as compared with the case of individually transmitting each frequency component. Thus, this embodiment enables the image quality degradation of the transmitted image to be estimated at a high precision by use of the feature quantity of the original image of which the information quantity is few.

Further, in accordance with this embodiment, subjecting the representative luminance value position information to the binary reversible compression enables the image quality degradation of the transmitted image to be estimated at a high precision by use of far much less information quantity.

Further, while an example of extracting the feature quantity whenever it was transmitted was made was explained in this embodiment, it is also possible to cause the feature quantity extracting device 11 to pre-extract the feature quantity in each frame of the moving image that is scheduled to be delivered. In such a case, it is good enough for the image transmitting device 1 to pre-store the moving image and the pre-extracted feature quantity of the above moving image correspondingly to each other, and to transmit the pre-stored moving image and the feature quantity of the above moving image responding to a request by the end user terminal 3.

Further, while the case that the image transmitting device 1 extracted and transmitted the feature quantity of the original image, and the end user terminal 3 collected a difference with the transmitted image, and estimated the image quality degradation of the transmitted image was exemplified for explanation in this embodiment, contrarily hereto, it is also possible to evaluate the image quality of the transmitted image in the transmission side. In such a case, it is good enough for the end user terminal 3 to include the representative luminance value deciding device 102, the representative luminance value position extracting device 103, and the feature quantity encoding device 104, to extract and transmit the feature quantity coming from the transmitted image. And, it is good enough for the image transmitting device 1 to include the feature quantity decoding device 302 and the error estimating device 303, to collect a difference with the original image, and to estimate the image quality degradation of the transmitted image. Additionally, in this case, an operation of deciding the representative luminance value that is performed by the representative luminance value deciding device 102 that the end user terminal 3 includes, an operation of extracting the representative luminance value position that is performed by the representative luminance value position extracting device 103, and an operation of encoding the feature quantity that is performed by the feature quantity encoding device 104 are similar to the operations already explained. Further, an operation of decoding the feature quantity that is performed by the feature quantity decoding device 302 that the image transmitting device 1 includes, and an operation of estimating the degradation that is performed by the error estimating device 303 are also similar to the operations already explained. Further, the transmission of the feature quality is made by a communication controlling device (not shown in the figure) that the end user terminal 3 includes. Additionally, each of the image transmitting device 1 and the end user terminal 3 may estimate the image quality degradation of the transmitted image.

Further, while an error was estimated with the luminance value defined as a target in this embodiment, the target is not limited hereto, and it is also possible to define, for example, the pixel components such as a color difference component value and an RGB value as a target. In such a case, similarly to the luminance value, it is good enough to extract the pixel component value that becomes a representative, to transmit the feature quantity that is comprised of the extracted pixel component value and the above pixel position, and to collect a difference with the pixel component value of the transmitted image.

Embodiment 2

Next, a second embodiment of the present invention will be explained. In this embodiment, the representative luminance value deciding device 102 divides the image frames into a plurality of regions, and extracts the representative luminance value in each divided region. FIG. 7 is an explanatory view illustrating an extraction example of the representative luminance value in the case of having divided the image frame into four pieces. As shown in FIG. 7, the representative luminance value deciding device 102 decides, for example, a luminance value [32] as a first representative luminance value in an upper left region. Further, it decides a luminance value [20] as a second representative luminance value in an upper right region. Further, it decides a luminance value [64] as a third representative luminance value in a low left region. Further, it decides a luminance value [48] as a fourth representative luminance value in a low right region. Additionally, the method for deciding the representative luminance value in each region is similar to that of the first embodiment.

Next, the representative luminance value position extracting device 103 extracts the pixel position in which the representative luminance value (each of first to fourth representative luminance values) in each region decided by the representative luminance value deciding device 102 appears within respective regions as a representative luminance value position. Additionally, the method for extracting the representative luminance value position is similar to that of the first embodiment. That is, in this embodiment, the information that is comprised of the representative luminance value of each region obtained by dividing the frame into plural pieces, and the representative luminance value position within respective regions is extracted as a feature quantity.

Next, the feature quantity encoding device 104 subjects the feature quantity that is comprised of the representative luminance value in each region, and the representative luminance value position within respective regions to the compression encoding. The method for the compression encoding is similar to that of the first embodiment. For example, all of the information quantity of the feature quantity become the information quantity of the representative luminance value in each region (8 bits×the frame division number)+the encoding quantity of the representative luminance value position subjected to the binary reversible encoding.

As mentioned above, in this embodiment, only with the quantity increased by adding the representative luminance values of which the number is a frame division number as an information quantity of the feature quantity, the high-precision image quality evaluation can be maintained also in the case that the appropriate representative luminance value cannot be extracted from a viewpoint of the entirety of one frame.

Embodiment 3

Figure 8:
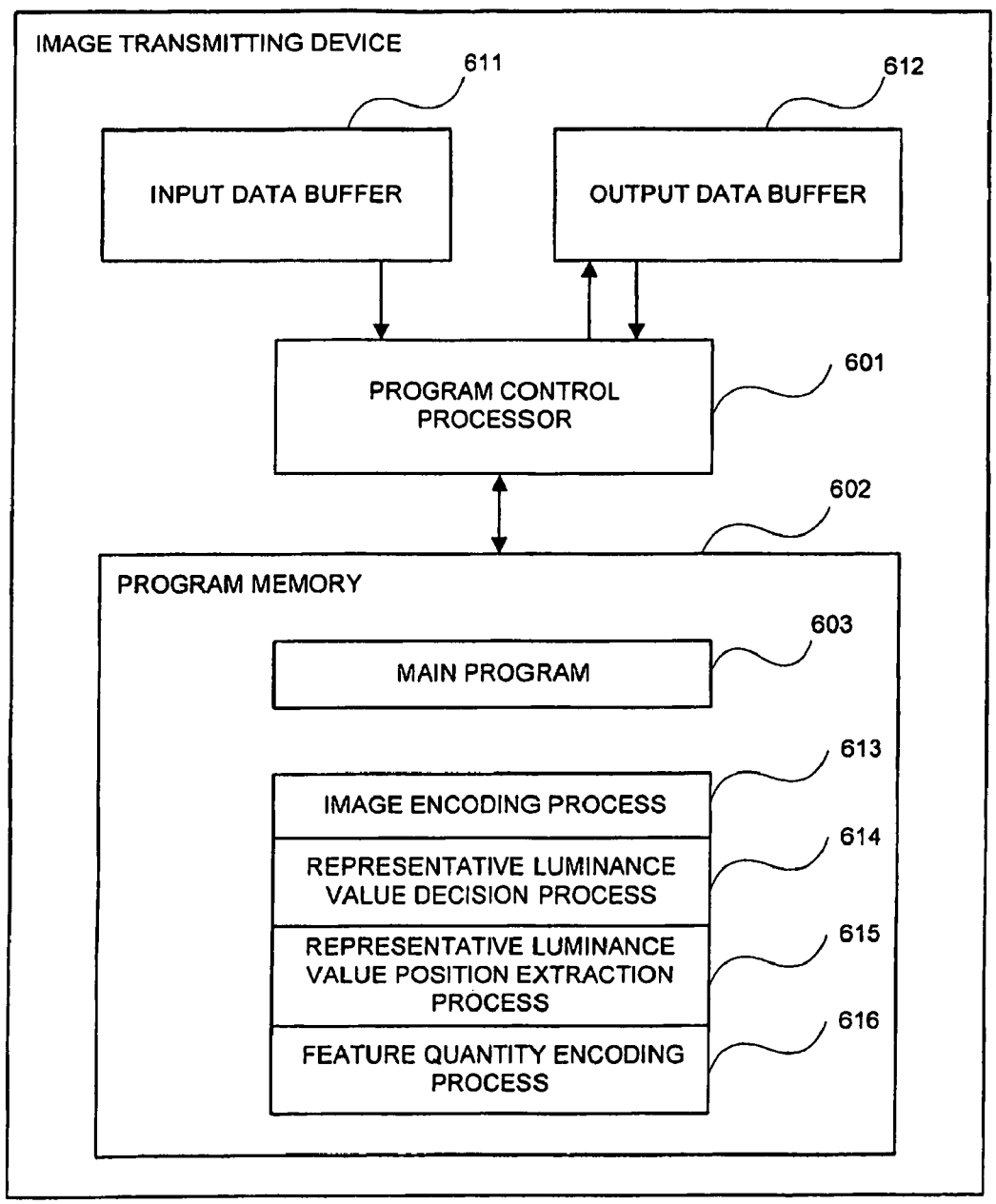
FIG. 8 is a block diagram illustrating a configuration example of an image transmitting device system in a third embodiment.
Figure 9:
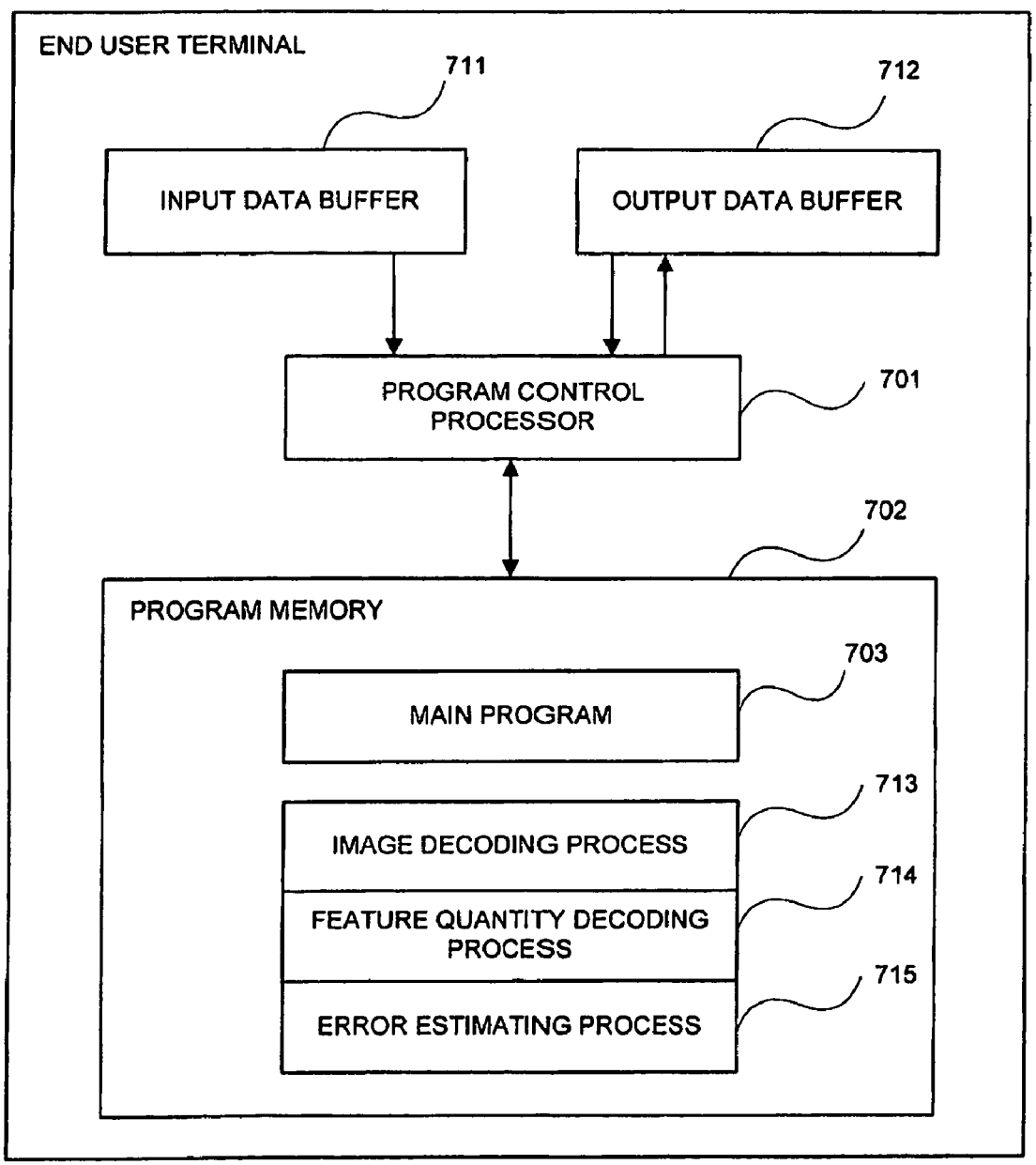
FIG. 9 is a block diagram illustrating a configuration example of an end user terminal system in a third embodiment.

Next, a third embodiment of the present invention will be explained. In this embodiment, an operation of each device in the foregoing first embodiment is executed with a computer system. FIG. 8 is a block diagram illustrating a configuration example of an image transmitting system in this embodiment. The image transmitting system in the embodiment is equivalent to the image transmitting device 1 in the first embodiment. Further, FIG. 9 is a block diagram illustrating a configuration example of an end user terminal system in this embodiment. The end user terminal system in this embodiment is equivalent to the end user terminal 3 in the first embodiment.

The image transmitting device system shown in FIG. 8 is provided with a program control processor 601. And, to the program control processor 601 is connected a program memory 602 in which a program has been stored for executing the process necessary for evaluating the image quality by the first embodiment in the side for transmitting the image besides an input data buffer 611 and an output data buffer 612.

The input data buffer 611 is a buffer for storing various pieces of data that is input into the program control processor 601. The output data buffer 612 is a buffer for storing various pieces of data that the program control processor 601 outputs, and further inputting data into the program control processor 601 responding to a necessity.

Program modules being stored in the program memory 602 includes an image encoding process module 613, a representative luminance value deciding process module 614, a representative luminance value position extracting process module 615, and a feature quantity encoding process module 616 besides a main program 603. The main program 603 is a main program for arranging and executing the processes necessary for evaluating the image quality by the first embodiment in the side for transmitting the image. Further, the image encoding process module 613, the representative luminance value deciding process module 614, the representative luminance value position extracting process module 615, and the feature quantity encoding process module 616 are process modules for functionally realizing the image encoding device 101, the representative luminance value deciding device 102, the representative luminance value position extracting device 103, and the feature quantity encoding device 104 in the first embodiment, respectively. Additionally, the processor 601 calls up each of the process modules 613 to 616 according to the main program 603, thereby to perform an operation similar to that of each of the devices 101 to 104 in the first embodiment.

Further, the end user terminal system shown in FIG. 9 is provided with a program control processor 701. And, to the program control processor 701 is connected a program memory 702 in which a program has been stored for executing the process necessary for evaluating the image quality by the first embodiment in the side for receiving the image besides a input data buffer 711 and an output data buffer 712.

The input data buffer 711 is a buffer for storing various pieces of data that is input into the program control processor 701. The output data buffer 712 is a buffer for storing various pieces of data that the program control processor 701 outputs, and further inputting data into the program control processor 701 responding to a necessity.

Program modules being stored in the program memory 702 includes an image decoding process module 713, a feature quantity decoding process module 714, and an error estimating process module 715 besides a main program 703. The main program 703 is a main program for arranging and executing the processes necessary for evaluating the image quality by the first embodiment in the side for receiving the image. The image decoding process module 713, the feature quantity decoding process module 714, and the error estimating process module 715 are process modules for functionally realizing the image decoding device 301, the feature quantity decoding device 302, and the error estimating device 303 in the first embodiment, respectively. Additionally, the processor 701 calls up each of the process modules 713 to 715 according to the main program 703, thereby to perform an operation similar to that of each of the devices 301 to 303 in the first embodiment.

In this embodiment, the program control processor 601 of the image transmitting device system, and the program control processor 701 of the end user terminal system execute various kinds of the processor modules 613 to 616 and various kinds of the processor modules 713 to 715 according to the main programs 602 and 702, respectively, thereby to perform the image quality evaluation process in the first embodiment.

Additionally, the program memories 602 and 702 store the program for executing the process necessary for the image quality evaluation by the second embodiment, respectively, thereby enabling execution as well of the process of evaluating the image quality in the second embodiment.

Further, it is also possible to evaluate the image quality of the transmitted image in the image transmitting device system side. In such a case, it is good enough for the end user terminal system to store in the program memory 702 the program module including the representative luminance value deciding process module 614, the representative luminance value position extracting process module 615, and the feature quantity encoding process module 616, and the main program 703 for causing an information processing device to execute a process of calling up the process modules 614 to 616, extracting the feature quantity from the transmitted image, and transmitting it. Further, it is good enough for the image transmitting device system to store in the program memory 602 the program module including the feature quantity decoding process module 714 and the error estimating process module 715, and the main program 603 for causing an information processing device to execute a process of calling up the process modules 714 and 715, collecting a difference with the original image from the feature quantity of the transmitted image that has been received, and estimating the image quality degradation of the transmitted image.

Additionally, in this case, an operation of extracting the feature quantity and an operation of encoding the feature quantity, which are performed by the program control processor 701 that the end user terminal system includes are similar to the operation of extracting the feature quantity and the operation of encoding the feature quantity, which are performed by the program control processor 601 that the image transmitting device system includes (that is, the operations by the representative luminance value deciding device 102, the representative luminance value position extracting device 103 and the feature quantity encoding device 104 already explained). Further, an operation of decoding the feature quantity and an operation of estimating the error, which are performed by the program control processor 601 that the image transmitting device system includes, are similar to the operation of decoding the feature quantity and the operation of estimating the error, which are performed by the program control processor 701 that the end user terminal system includes (that is, the operations by the feature quantity decoding device 302 and the error estimating device 303 already explained).

Example 1

Next, an operation of the best mode for carrying out the present invention will be explained by employing a specific example. This example corresponds to the first embodiment. Herein, the case of transmitting the image inputted into a moving image processing device that operates as the image transmitting device 1 to the end user terminal 3 is exemplified for explanation.

At first, the moving image of an SDTV size (horizontal-positioned 720.times.vertical-positioned 480 pixel array, and 29.97 frames per one second) is inputted into the moving image processing device. The image encoding device 101 of the moving image processing device encodes the image with the MPEG-2 encoding technique.

Further, the feature quantity extracting device 11 of the moving image processing device extracts the feature quality of each frame of the inputted moving image. Specifically, the representative luminance value deciding device 102, firstly, divides one frame, being a target, into small blocks having a 16.times.16 pixel array. And, it computes the luminance value standard deviation in each block. The representative luminance value deciding device 102 re-arranges the luminance value standard deviation of each block in a descending order of size, and obtains its median. And, it decides the luminance value of which the appearance probability is closest to $1/256$ as a representative luminance value in a half of the blocks with the obtained median at a center. Herein, it is assumed that the luminance value [32] is decided as a representative luminance value in the target frame.

Next, the representative luminance value position extracting device 103 extracts the pixel position in which the representative luminance value appears within the target frame. Firstly, the representative luminance value position extracting device 103 collects block information that the representative luminance value [32] appears within each block divided by the representative luminance value deciding device 102. For example, the representative luminance value position extracting device 103, with regard to the position information, determines whether or not the representative luminance value appears block by block, assigns 1 when the representative luminance value has appeared in bit position caused to correspond to the block position, and assigns 0 when it has not appeared. That is, it follows that the representative luminance value position extracting device 103 generates a binary sequence that is comprised of 1,350 bits as information indicative of the position of the effective block for one frame having a 720.times.480 pixel array. Herein, it is assumed that 500 pieces of the representative luminance value [32] have appeared within 200 blocks with regard to the target frame. Thus, the representative luminance value position extracting device 103 generates a binary sequence in which 1 (one) has been assigned to 200 bits, out of 1,350 bits as information indicative of the position of the effective block.

Next, the representative luminance value position extracting device 103 scans an intra-block pixel array that is comprised of 256 pixels in an order of a luster scan with regard to the effective block, and determines whether or not the representative luminance value has appeared. And, the representative luminance value position extracting device 103 assigns 1 when the representative luminance value has appeared in the bit position caused to correspond to the intra-block pixel position, and assigns 0 when it has not appeared. That is, it follows that the representative luminance value position extracting device 103 generates a binary sequence that is comprised of 256 bits as information indicative of the intra-block representative luminance value position for one block of 256 pixels. And, it follows that the representative luminance value position extracting device 103 generates a binary sequence that is comprised of the effective block number (200)×256 bits as information indicative of the intra-block representative luminance value positions of all effective blocks. Additionally, 1 (one) ought to be assigned to 500 bits, out of the effective block number (200)×256 bits.

Next, the feature quantity encoding device 104 subjects the representative luminance value position information extracted in such a manner (the binary sequence that is comprised of 1,350 bits+256 bits×the effective block number (200)) to the reversible compression with the JBIG technique. And, it affixes 8-bit information indicative of the representative luminance values [32] to a head thereof, and defines this as a feature quantity of the original image in the target frame.

And, the feature quantity (encoded feature quantity) of the original image in the target frame, which has been encoded, is transmitted to the end user terminal 3 via the transmitting path 2 so that it is synchronized with the target frame of the encoded image obtained by encoding the original image.

The end user terminal 3 having received the encoded image and the encoded feature quantity performs a decoding process corresponding to the MPEG-2 technique for the encoded image that has been encoded with the MPEG-2 technique in the image decoding device 301, and generates the image frame so that its text coincides with the context of the target frame of the original image. The recovered image frame is sent to the error estimating device 303.

Further, the feature quantity decoding device 302 performs a decoding process corresponding to the encoding technique by the feature quantity encoding device 104 for the encoded feature quantity that has been received, generates information indicative of such a feature quantity of which the text becomes identical to that of the feature quantity that has not been encoded by the feature quantity encoding device 104. Specifically, it is good enough to perform a process that is mathematically contrary to the process performed by the feature quantity encoding device 104. Herein, the feature quantity encoding device 104 recovers the encoded feature quantity to the information indicative of the representative luminance value, and the representative luminance value position information indicative of the pixel position in which the representative luminance value has appeared within the original image. Specifically, the feature quantity encoding device 104 obtains the information indicative of the representative luminance values [32], the binary sequence, being information indicative of the position of the effective block, and the binary sequence, being information indicative of the pixel position in which the representative luminance value has appeared within each effective block. The recovered feature quantity is sent to the error estimating device 303.

The error estimating device 303 estimates the image quality degradation of the transmitted image based upon the recovered information. The error estimating device 303, for the image frame of the transmitted image, collects the luminance value of a pixel position identical to the pixel position in which the representative luminance value [32] has appeared within the original image. Herein, it is assumed that existence of 100 locations at which the luminance value has become [32], 100 locations at which the luminance value has become [31], 100 locations at which the luminance value has become [30], 100 locations at which the luminance value has become [29], and 100 locations at which the luminance value has become [33], out of 500 locations each of which is identical to the location of the original image in which the representative luminance value [32] has appeared, has been collected in the target frame of the transmitted image that has been received and recovered.

The error estimating device 303 obtains (100×0+100×1+100×4+100×9+100×1)÷500=3 as an estimated square-law error.

This, application is based upon and claims the benefit of priority from Japanese patent application No. 2006-285290, filed on Oct. 19, 2006, the disclosure of which is incorporated herein in its entirety by reference.

HOW THE INVENTION IS CAPABLE OF INDUSTRIAL EXPLOITATION

The present invention is preferredly applicable to the system for evaluating the image quality degradation due to encoding in the reception side and is not limited hereto, and to the image quality evaluation system for evaluating a difference between two images by use of a limited information quantity.

The invention claimed is:

1. An image quality evaluation method for evaluating an image quality of a decoded image, being a second image, said decoded image obtained by decoding an encoded image obtained by encoding an original image, being a first image, in a transmission destination, said image quality evaluation method comprising:
    evaluating the image quality of the second image from a difference with the first image, including
    from an image frame of one of the images, extracting a representative pixel component value indicative of a pixel component value that represents pixels within the above image frame, and pixel position information indicative of a pixel position in which said representative pixel component value appears as a feature quantity, and
    by employing the representative pixel component value and the pixel position information each of which is the feature quantity of said image, estimating a difference of said entire second image with said first image based upon a difference between the pixel component value at the pixel position being indicated by said pixel position information, and said representative pixel component value within the image frame of the other image;
    extracting the representative pixel component value and the pixel position information as a feature quantity of said original image from the image frame of said original image;
    encoding said extracted feature quantity of said original image;
    transmitting said encoded feature quantity of said original image to the transmission destination of said encoded image;
    upon receipt of said encoded feature quantity of said original image, decoding said encoded feature quantity of said original image that has been received; and
    estimating a difference with said original image as a degree of image quality degradation of said decoded image based upon the representative pixel component value and the pixel position information each of which is the feature quantity of said original image obtained by decoding, and image information of said decoded image.

2. An image quality evaluation method according to claim 1, wherein the pixel position information is expressed with binary information indicating whether or not the component value of the above pixel is a representative pixel component value by use of 1 or 0, respectively, for each pixel.

3. An image quality evaluation method according to claim 2, wherein the pixel position information expressed with the binary information is subjected to reversible encoding.

4. An image quality evaluation method according to claim 3, wherein the reversible encoding method is an arithmetic encoding method.

5. An image quality evaluation method according to claim 3, wherein the reversible encoding method is a JBIG encoding method, being a binary image encoding method.

6. An image quality evaluation method according to claim 1,
wherein the image frame, being a target, is divided into a plurality of small regions; and
wherein the pixel position information is expressed with binary information indicating whether or not the representative pixel component value appears within each small region by use of with 1 or 0, respectively, and binary information indicating whether or not the component value of the above pixel is a representative pixel component value by use of 1 or 0, respectively, for each pixel within the small region in which the representative pixel component value has appeared.

7. An image quality evaluation method according to claim 6, wherein the pixel position information expressed with the binary information is subjected to reversible encoding.

8. An image quality evaluation method according to claim 7, wherein the reversible encoding method is an arithmetic encoding method.

9. An image quality evaluation method according to claim 7, wherein the reversible encoding method is a JBIG encoding method, being a binary image encoding method.

10. An image quality evaluation method for evaluating an image quality of a decoded image, being a second image, said decoded image obtained by decoding an encoded image obtained by encoding an original image, being a first image, in a transmission destination, said image quality evaluation method comprising:
evaluating the image quality of the second image from a difference with the first image, including
from an image frame of one of the images, extracting a representative pixel component value indicative of a pixel component value that represents pixels within the above image frame, and pixel position information indicative of a pixel position in which said representative pixel component value appears as a feature quantity, and
by employing the representative pixel component value and the pixel position information each of which is the feature quantity of said image, estimating a difference of said entire second image with said first image based upon a difference between the pixel component value at the pixel position being indicated by said pixel position information, and said representative pixel component value within the image frame of the other image;
extracting the representative pixel component value and the pixel position information as a feature quantity of said decoded image from the image frame of said decoded image;
encoding said extracted feature quantity of said decoded image;
transmitting said encoded feature quantity of said decoded image to a transmission source of said encoded image;
upon receipt of said encoded feature quantity of said decoded image, decoding said encoded feature quantity of said decoded image that has been received; and
estimating a difference with said original image as a degree of image quality degradation of said decoded image based upon the representative pixel component value and the pixel position information each of which is the feature quantity of said decoded image obtained by decoding, and image information of said original image.

11. An image quality evaluation method according to claim 10, wherein the pixel position information is expressed with binary information indicating whether or not the component value of the above pixel is a representative pixel component value by use of 1 or 0, respectively, for each pixel.

12. An image quality evaluation method according to claim 11, wherein the pixel position information expressed with the binary information is subjected to reversible encoding.

13. An image quality evaluation method according to claim 12, wherein the reversible encoding method is an arithmetic encoding method.

14. An image quality evaluation method according to claim 12, wherein the reversible encoding method is a JBIG encoding method, being a binary image encoding method.

15. An image quality evaluation method according to claim 10,
wherein the image frame, being a target, is divided into a plurality of small regions; and
wherein the pixel position information is expressed with binary information indicating whether or not the representative pixel component value appears within each small region by use of with 1 or 0, respectively, and binary information indicating whether or not the component value of the above pixel is a representative pixel component value by use of 1 or 0, respectively, for each pixel within the small region in which the representative pixel component value has appeared.

16. An image quality evaluation method according to claim 15, wherein the pixel position information expressed with the binary information is subjected to reversible encoding.

17. An image quality evaluation method according to claim 16, wherein the reversible encoding method is an arithmetic encoding method.

18. An image quality evaluation method according to claim 16, wherein the reversible encoding method is a JBIG encoding method, being a binary image encoding method.

19. An image quality evaluation method for evaluating an image quality of a second image from a difference with a first image, said image quality evaluation method comprising:
from an image frame of one of the images, extracting a representative pixel component value indicative of a pixel component value that represents pixels within the above image frame, and pixel position information indicative of a pixel position in which said representative pixel component value appears as a feature quantity; and
by employing the representative pixel component value and the pixel position information each of which is the feature quantity of said image, estimating a difference of said entire second image with said first image based upon a difference between the pixel component value at the pixel position being indicated by said pixel position information, and said representative pixel component value within the image frame of the other image, wherein the pixel component value that appears in an equal position without being biased within the image frame, being a target, is selected, thereby to extract the representative pixel component value.

20. An image quality evaluation method for evaluating an image quality of a second image from a difference with a first image, said image quality evaluation method comprising:
from an image frame of one of the images, extracting a representative pixel component value indicative of a pixel component value that represents pixels within the above image frame, and pixel position information indicative of a pixel position in which said representative pixel component value appears as a feature quantity; and
by employing the representative pixel component value and the pixel position information each of which is the feature quantity of said image, estimating a difference of said entire second image with said first image based upon a difference between the pixel component value at the pixel position being indicated by said pixel position information, and said representative pixel component value within the image frame of the other image,
wherein the image frame, being a target, is divided into a plurality of small regions, a standard deviation of the pixel component value in each small region is obtained, and the small regions are selected in an order of having the standard deviation of which the value is close to a central value of said standard deviation; and
wherein the pixel component value of which an appearance probability is closest to 1/a portion of a value width that the above pixel component value can assume is selected within the selected small region, thereby to extract the representative pixel component value.

21. An image quality evaluation method for evaluating an image quality of a second image from a difference with a first image, said image quality evaluation method comprising:
from an image frame of one of the images, extracting a representative pixel component value indicative of a pixel component value that represents pixels within the above image frame, and pixel position information indicative of a pixel position in which said representative pixel component value appears as a feature quantity; and
by employing the representative pixel component value and the pixel position information each of which is the feature quantity of said image, estimating a difference of said entire second image with said first image based upon a difference between the pixel component value at the pixel position being indicated by said pixel position information, and said representative pixel component value within the image frame of the other image,
wherein a lower-limit value and an upper-limit value of the pixel component value are pre-decided at the moment of extracting the representative pixel component value, and the pixel component value smaller than the lower-limit value and the pixel component value larger than the upper-limit value are excluded from among candidates for the representative pixel component value.

22. An image quality evaluation system for evaluating an image quality of a decoded image, being a second image, said decoded image obtained by decoding an encoded image obtained by encoding an original image, being a first image, in a transmission destination, said image quality evaluation system comprising an image transmitting device for encoding and transmitting an inputted original image, and an image receiving device for receiving the encoded image from said image transmitting device;
a feature quantity extracting unit for, from an image frame of one of the images, extracting a representative pixel component value indicative of a pixel component value that represents pixels within the above image frame, and pixel position information indicative of a pixel position in which said representative pixel component value appears as a feature quantity, the feature quantity extracting unit further for, from the image frame of said original image, extracting the representative pixel component value and the pixel position information as a feature quantity of said original image;
an error estimating unit for, by employing the representative pixel component value and the pixel position information each of which is the feature quantity of said image extracted by said feature quantity extracting unit, estimating a difference of the entire second image with the first image based upon a difference between the pixel component value at the pixel position being indicated by said pixel position information, and said representative pixel component value within the image frame of the other image;
a feature quantity encoding unit for encoding the feature quantity of the original image extracted by said feature quantity extracting unit; and
a feature quantity transmitting unit for transmitting the feature quantity of the original image encoded by said feature quantity encoding unit to said image receiving device; and
wherein said image receiving device comprises:
a feature quantity receiving unit for receiving said encoded feature quantity of said original image;
a feature quantity decoding unit for decoding said encoded feature quantity of said original image received by said feature quantity receiving unit; and
an error estimating unit for estimating a difference with said original image as a degree of image quality degradation of said decoded image based upon the representative pixel component value and the pixel position information each of which is the feature quantity of said original image obtained by decoding, and image information of said decoded image.

23. An image quality evaluation system for evaluating an image quality of a decoded image, being a second image, said decoded image obtained by decoding an encoded image obtained by encoding an original image, being a first image, in a transmission destination, said image quality evaluation system comprising an image transmitting device for encoding and transmitting an inputted original image, and an image receiving device for receiving the encoded image from said image transmitting device;
a feature quantity extracting unit for, from an image frame of one of the images, extracting a representative pixel component value indicative of a pixel component value that represents pixels within the above image frame, and pixel position information indicative of a pixel position in which said representative pixel component value appears as a feature quantity, the feature quantity extracting unit further for, from the image frame of said decoded image, extracting the representative pixel component value and the pixel position information as a feature quantity of said decoded image;
an error estimating unit for, by employing the representative pixel component value and the pixel position information each of which is the feature quantity of said image extracted by said feature quantity extracting unit, estimating a difference of the entire second image with the first image based upon a difference between the pixel component value at the pixel position being indicated by said pixel position information, and said representative pixel component value within the image frame of the other image;
a feature quantity encoding unit for encoding the feature quantity of the decoded image extracted by said feature quantity extracting unit;
a feature quantity transmitting unit for transmitting the feature quantity of the decoded image encoded by said feature quantity encoding unit to said image transmitting device;
wherein said image transmitting device comprises:
a feature quantity receiving device for receiving said encoded feature quantity of said decoded image;
a feature quantity decoding unit for decoding said encoded feature quantity of said decoded image received by said feature quantity receiving unit; and
an error estimating unit for estimating a difference with said original image as a degree of image quality degradation of said decoded image based upon the representative pixel component value and the pixel position information each of which is the feature quantity of said decoded image obtained by decoding, and image information of said original image.

24. An image transmitting device that is applied for an image quality evaluation system for evaluating an image quality of a decoded image, said decoded image obtained by decoding an encoded image obtained by encoding an original image in a transmission destination, said image transmitting device comprising:
an encoded image transmitting unit for encoding and transmitting an inputted original image;
a feature quantity extracting unit for, from an image frame of said inputted original image, extracting a representative pixel component value indicative of a pixel component value that represents pixels within the above image frame, and pixel position information indicative of a pixel position in which said representative pixel component value appears as a feature quantity of said original image;
a feature quantity encoding unit for encoding the feature quantity of the original image extracted by said feature quantity extracting unit; and
a feature quantity transmitting unit for transmitting the feature quantity of the original image encoded by said feature quantity encoding unit to an image receiving device, being a transmission destination of said encoded image.

25. An image transmitting device that is applied for an image quality evaluation system for evaluating an image quality of a decoded image, said decoded image obtained by decoding an encoded image obtained by encoding an original image in a transmission destination, said image transmitting device comprising:
an encoded image transmitting unit for encoding and transmitting an inputted original image;
a feature quantity receiving unit for receiving information in which a representative pixel component value indicative of a pixel component value that represents pixels within the image frame of said decoded image, and pixel position information indicative of a pixel position in which said representative pixel component value appears have been encoded as a feature quantity of said decoded image;
a feature quantity decoding unit for decoding said encoded feature quantity of said decoded image received by the feature quantity receiving unit; and
an error estimating unit for, by employing the representative pixel component value and the pixel position information each of which is the feature quantity of said decoded image obtained by decoding, estimating a difference with said original image as a degree of image quality degradation of said decoded image based upon a difference between the pixel component value at the pixel position being indicated by said pixel position information, and said representative pixel component value within the image frame of said original image.

26. An image receiving device that is applied for an image quality evaluation system for evaluating an image quality of a decoded image, said decoded image obtained by decoding an encoded image obtained by encoding an original image in a transmission destination, said image receiving device comprising:
an encoded image receiving unit for receiving the encoded image obtained by encoding the original image;
a feature quantity receiving unit for receiving information in which a representative pixel component value indicative of a pixel component value that represents pixels within an image frame of said original image, and pixel position information indicative of a pixel position in which said representative pixel component value appears have been encoded as a feature quantity of said original image;
a feature quantity decoding unit for decoding said encoded feature quantity of said original image received by the feature quantity receiving unit; and
an error estimating unit for, by employing the representative pixel component value and the pixel position information each of which is the feature quantity of said original image obtained by decoding, estimating a difference with said original image as a degree of image quality degradation of said decoded image based upon a difference between the pixel component value at the pixel position being indicated by said pixel position information, and said representative pixel component value within the image frame of the decoded image obtained by decoding said encoded image.

27. An image receiving device that is applied for an image quality evaluation system for evaluating an image quality of a decoded image, said decoded image obtained by decoding an encoded image obtained by encoding an original image in a transmission destination, said image receiving device comprising:
an encoded image receiving unit for receiving the encoded image obtained by encoding the original image;
a feature quantity extracting unit for, upon receipt of said encoded image, from an image frame of the decoded image obtained by decoding said encoded image, extracting a representative pixel component value indicative of a pixel component value that represents pixels within above image frame, and pixel position information indicative of a pixel position in which said representative pixel component value appears as a feature quantity of said decoded image;
a feature quantity encoding unit for encoding the feature quantity of the decoded image extracted by said feature quantity extracting unit; and
a feature quantity transmitting unit for transmitting the feature quantity of the decoded image encoded by said feature quantity encoding unit to an image transmitting device, being a transmission source of said encoded image.

* * * * *